United States Patent Office 3,143,145
Patented Aug. 4, 1964

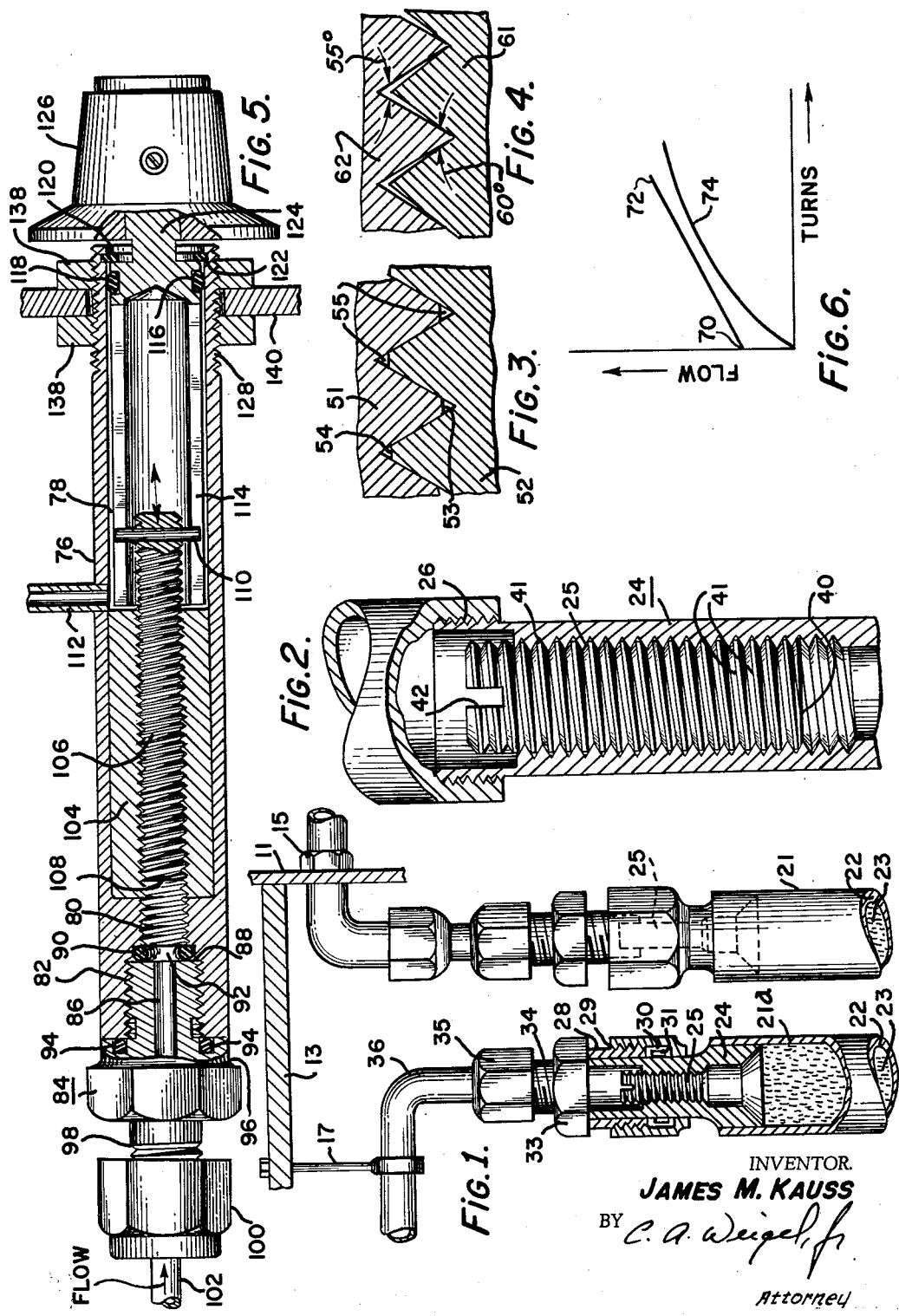

3,143,145
METHOD AND MEANS OF CONTROLLING THE RATE OF FLUID FLOW
James M. Kauss, Wilmington, Del., assignor to F & M Scientific Corporation, a corporation of Delaware
Filed Feb. 28, 1963, Ser. No. 261,600
1 Claim. (Cl. 138—43)

The present invention relates to a method and a means for controlling fluid flow rate. The method and means of this invention has particular application to equalizing the flow rates between columns or conduits. A specific application of the method and means of this invention lies in the gas chromatography field although the invention has general application to many other fields where similar problems are encountered.

In the art of gas chromatography, for example, it is common to use elongated columns often singley but sometimes in series, parallel, or series-parallel combinations. A carrier gas is passed through these columns and carries with it certain materials to be analyzed. These columns typically are packed with finely divided materials or the inner wall of the column is coated with a material having the necessary characteristics for adsorbing and desorbing gases, vapors, etc. These columns or tubes are often of relatively small diameter, sometimes in the capillary sizes. The function of the columns is to selectively adsorb and desorb the materials which are to be analyzed at varying rates and thereby effect their separation. As the components of the samples are desorbed they are individually detected in the detector part of the instrument, e.g., by thermalconductivity etc., which forms no part of the present invention.

In a typical gas chromatograph two or more columns may be placed in parallel especially where it is desired to increase the through-put of the chromatograph. In such cases it is desirable that the two columns have the pressure drop occurring in each precisely or exactly balanced to insure that equal quantities of the material being tested and of the carrier gas to pass through the respective conduits or columns at equal rates. In the past many attempts have been made to control the rate of flow of a fluid (either liquid or gas) through a conduit. Typically such attempts have taken the form of bias pressure reducing valves, variable ports, adjustable needle valves, etc. These devices have one common defect in that they lack the fine degree of control necessary to precisely control the rate of flow especially when the flow volume is relatively low as in gas chromatography.

The precise control of fluid flow rates of either liquids or gases requires apparatus with facility for fine adjustment if the control is to be sufficiently accurate. If small orifices are used they tend either to enlarge by wear, abrasion, or corrosion or else they tend to clog due to minor impurities or foreign matter in the fluid which is passing through the orifices. Additionally, in conventional needle valves, the response of the needle valve to adjustment is non-linear, i.e., the rate of fluid flow through the valves does not vary linearly with the number of turns the valve is opened. In the case of spring control pressure valves, the springs vary in tension, parts become clogged or jammed, etc. Furthermore, these devices usually do not permit the precise adjustment required for a relatively accurate control of low flow rates as is necessary particularly in the case of gas chromatography.

Accordingly it is an object of this present invention to obviate many of the disadvantages inherent in prior flow control devices.

Another object of this invention is to provide a relatively simple and yet accurate fluid flow control device.

In accordance with a preferred form of the present invention two screw members respectively having internally and externally threaded portions are selected. If now, the crest of one or both of the threads of the first and second members is removed, a helical passageway along the engaged threaded portions is formed. By simply rotating the two members about their common axes relative to each other, the length of this helical passageway is varied. The rate of flow of fluid through such helical passageway may be varied by the simple expedient of adjusting the length of helical passageway. A particular advantage of the invention is that the variation in rate of fluid flow through the passageway is directly related to the magnitude of relative angular rotation between the members.

The invention will be more fully understood with reference to the detailed description which follows in connection with the accompanying drawings, in which:

FIGURE 1 is a diagrammatic fragmentary representation of a portion of a gas chromatograph containing two parallel columns in which the flow rate control device of this invention is incorporated;

FIGURE 2 is an enlarged sectional detail showing a part of the flow rate control device;

FIGURE 3 is a fragmentary detail of the threads of FIG. 2; greatly enlarged showing still another embodiment of this invention;

FIGURE 4 is another diagrammatic view, in section, greatly enlarged showing how the threads are formed in accordance with another embodiment of this invention;

FIGURE 5 is a diagrammatic view, partly in section and greatly enlarged, showing still another embodiment of this invention; and FIGURE 6 is a curve illustrating the relationship between flow rate and the number of turns of the flow rate adjusting screw of FIG. 5.

Referring first to FIGURE 1, there is shown a fragmentary part 11 of the frame work of a chromatograph, not otherwise shown in detail, which part 11 is connected to another frame portion 13. A plurality of columns, i.e., two, as indicated at 21 and 21a, are supported mechanically by the structures 11 and 13 by any suitable fastening or supporting means such as those indicated at 15 and 17 respectively. The two fastening means may be identical and may consist of hangers such as 17 or of elbow fastenings with threaded fasteners such as indicated at 15.

A typical chromatograph column, as shown fragmentarily in FIGURE 1, consists of a packed tube 22 of glass, metal, or any suitable material. This is usually filled with finely divided porous or granular packing material 23 which is sufficiently open to permit carrier gas (and eventually sample gas or vapor) to pass through the column. In operation, as is well known, the sample fluid, whether gas, liquid, or vapor, is first adsorbed, at least to some degree, by the packing. It later is desorbed and the relative times of adsorption and desorption are used as a means for separating the sample into its components. This permits the analysis and identification of constituents of the material contained in the sample. The tube 22 may be provided with a connector or reducer 24 at one end; the upper end in the drawing, which reducer 24 is threaded internally as indicated at 25. See FIGURE 2 where these parts are shown considerably enlarged. The threaded portion 25 terminates near the top of the reducer or connector 24, being continued by a smooth surface somewhat larger in diameter than the threads, as indicated at 26. The reducer or connector 24 itself is received within the interior of a larger externally threaded, outer connector 28 which has its threaded portion 29 adapted to fit into the internally threaded part of a union or coupling 30. The latter contains a gasket or packing gland 31 which surrounds the exterior of the connector 24. Upon tightening the union 30 onto the threaded portion 29 of the outer connector 28, the gasket or packing gland 31 is compressed around connector 24 as well as longitudinally to insure a fluid-tight joint. The outer connector 28 is provided with a polyhedric or flat sided upper portion 33 to facilitate assembly by means of a wrench or like tool. It also is extended upwardly with a neck portion 34 which is threaded to receive a connecting and packer nut 35. The latter connects the tube 22 to a line 36 through which the gas flows along with any sample material entrained therein. The details just recited are given in connection with the left tube 22 of FIGURE 1, but it will be understood that the construction of the other tube 22 at the right may be essentially identical. The parts need not be identical in detailed design so long as they perform this function.

It will also be understood that instead of merely two columns, three, four or more may be connected in parallel, series, series-parallel, or used independently. They maye be provided with suitable valve means or other known coupling devices (not shown) for convenient connection.

As is indicated more clearly in FIGURE 2, the internally threaded portion or threads 25 of connector 24 is adapted to receive an elongated plug 40. This plug 40 has external threads 41 adapted to engage or fit the threads 25. These threads 25 and 41 are formed with relatively close manufacturing tolerances such that the depth of the engagement of the threads 25 and 41 is substantially 100% of the thread surface. The only manufacturing tolerance desired is that it be sufficient to permit the threaded plug 40 to be turned within the connector 24. In a preferred form of the invention the crest of one of the threads 25 or 41 is removed. Alternatively, the crest of both threads may be removed. Whether one or both of the crests are removed and the amount of crest that is removed is purely a matter of choice and will depend upon the desired flow rate of materials through connector 24.

There is thus formed a helical passageway along the threads 25 and 41 through which fluids may flow. The length of the passageway is determined by the number of turns of the threads that are in engagement. Hence by screwing the plug 40, which is fitted with a screwdriver fitting 42, further into the neck of connector 24, the flow rate, and hence the pressure drop of a fluid, may be increased in proportion to the length of the passageway. Conversely, by screwing out the plug 40 part way, the length of the spiral path is reduced. The corresponding pressure drop or reduction through this part of the passageway is then reduced.

By this means, assuming, for example, that there is a slight imbalance in pressure or flow rate between the tubes 21 and 21a, they may be brought into relatively precise balance by adjustment of the plug 40. The adjustment is made by merely disconnecting one of the unions or connectors 35 or 30, inserting a screwdriver into slot 42, and adjusting the plug 40 inwardly or outwardly to bring the pressure reductions or flow rates through the tube assemblies into the required balance.

In FIGURE 6 there is illustrated a graph showing the relationship between the rate of fluid flow, plotted as the ordinant versus the number of turns of the plug 40, plotted as the abcissa of the flow control device of this invention. It will be noted that the flow rate is a relatively linear function of the number of turns of the screw plug 40, and varies between a maximum value denoted by the point 72 and a minimum value denoted by the point 70. This minimum value is determined by the cross-section area 55 (FIG. 3) of the helical flow path and the maximum number of threads that can be engaged. The flow rate is at its maximum value (point 72) when the length of the helical flow path is reduced to a minimum as by unscrewing the plug 40 until it is on the verge of becoming disengaged. This linear characteristic is in contrast to that normally shown by a conventional needle type valve in which the response is not linear as illustrated, for example, by the curve 74 and FIG. 4. This invention has a further advantage in that relatively precise control may be obtained over the flow rate. In a typical device constructed in accordance with this invention flow rates in the order of cubic centimeters per minute have been obtained. The total pressure drop occurring in single as well as multiple gas chromatograph tubes can be brought to various desired levels by proper design and adjustment of the threaded parts 24, 40. Thus, in the embodiment illustrated in FIG. 3 the crests 53 and 54 of both the external and internal threads are removed. This provides two parallel helical paths which permit greater flow rates than is possible with a single path. The crest of the thread of the internal member 51 is shown at 53 and the crest of thread of the external member 52 is shown at 54. These form helical passageways or conduits having the cross-section shape 55.

The threads may be formed by an ordinary mechanical machine threading operation, leaving flat lands at the crest of the thread, or the threads may be partly ground or cut off as in the turning lathe. In this manner simple and conventional thread cutting or machining operations suffice to provide a device permitting relatively precise control over pressure reduction in flowing gas, liquid, or vapor streams.

In accordance with the invention, the minor diameter of each of the screw threads 25 and 41 are substantially equal, whereas the major diameter of the external screw threads 41 is substantially equal to or less than the major diameter of the internal screw threads 25. The allowance between the crest and root of the engaged threaded elements is sufficient to permit flow of fluids. This is the preferred embodiment of the invention inasmuch as the helical path is formed having the largest possible length for a given thread diameter. Alternatively, of course, the helical path may be formed along the minor diameter of the screw threads. In this instance, the major diameters of the screw threads are made substantially equal and the minor diameter of the internal screw threads is made substantially equal to or less than the minor diameter of the external screw threads thereby forming the helical passageway. The only requirement of the invention as to tolerances is that the respective threads be in substantial engagement but for the removed crest portion of one or both. The precise tolerances will vary with the viscosity or fluidity of the fluid whose flow is to be controlled. With fluids of low viscosity a tighter fit is of course required than with fluid of greater viscosity. The fit of the threads must be sufficient to cause the fluid to flow along the helical conduit formed rather than between the engaging thread surfaces.

Referring to FIGURE 4, another arrangement is shown where two slightly different types of threaded elements are threaded together. Use is made of two different but conventional thread designs. For example, the external or female member 61 may be threaded with the conventional United States standard or S.A.E. thread which has a cross-sectional angle through the thread of 60°. On the other hand, the internal or male member 62 has a different conventional thread, here shown as the British standard or Whitworth thread having a cross-sectional angle of 55°. By this means greater clearance is obtained between the mating parts than is customary in the manufacturing tolerances provided by standard machining practices. Further variations can be made, as desired.

In FIG. 5 there is illustrated in partial cutaway still another embodiment of this invention wherein the flow rate control device of FIG. 1 is further modified to perform the same function as the conventional needle valve but yet provide a linear characteristic. The particular design of the flow rate control device of FIG. 5 is one that is adapted to be mounted on a panel type instrument and control the flow rate of a fluid from a tube 102 to an exit tube 112. The device itself includes a tubular body member 76 formed of a suitable material such as stainless steel. The body member 76 has a bore 78 through the major portion of its length. A portion of the bore 80 is of reduced diameter and threaded to provide a guide for the adjusting plug or screw 106. The bore 80 includes a threaded counterbored portion 82, and an end plug 84. The end plug 84 includes a bore 86 and a threaded neck portion 98 on which a packernut is adapted to be threaded to position the tube 102.

The end plug 84 has a flat end portion 88 adjacent a cavity 92 in which an O ring 90 is placed to prevent flow of the fluid about the end plug 84 when it is tightened against the O ring. The end plug 84 also includes a flanged portion 96 having annular planar surface in which is formed an annular recess 94 to accommodate an additional O ring or suitable packing material to provide a double seal.

A metering plug 104 is formed within the bore 78, as by casting, it using a suitable material, to fill the entire portion of the bore 78 about the adjusting screw 106 between the bore 80 and the exit tube 112. After casting the metering plug 104, the crests of the threads on the adjusting screw may be removed as described hereinbefore. Then the adjusting screw 106 is reinserted into the metering plug 104. This technique provides an excellent thread fit with close tolerances. The exit tube 112 is positioned and preferably welded in a hole formed in the side of the tubular body 76. A drive pin is inserted in one end of the adjusting screw 106.

To facilitate turning the adjusting screw 106 from a point external to the tubular body 106, a slotted sleeve 114 is fitted over the free end (right hand end in the drawing) of the adjusting screw 106 such that the edge slots engage the drive pin 110. A peripheral groove 116 is formed about the non-slotted end of the sleeve 114 to accommodate a suitable packing gland 118 to prevent leakage of the fluids outside of the tubular body 76. Finally a retaining ring 122 is snapped into a groove 122 in the tubular body 76 to retain the entire slotted sleeeve assembly in position. An adjusting knob 126 may be placed on the end of the slotted sleeve 114 of desired. External threads 128 are formed on the one end of the tubular body 76 to facilitate its mounting in a hole in a panel 140. With such mounting, suitable jam nuts 138 are tightened against either side of the panel 140 to accomplish the mounting.

With this arrangement, by rotation of the knob 126, the slotted sleeve 114 causes the adjusting screw 106 to rotate within the metering plug 104 and thereby vary the length of the helical path described hereinbefore. When the adjusting screw 106 is tightened such that its end 108 abuts the O ring 90, the valve is completely closed and no fluid is permitted to pass through to the exit tube 112. Once the valve is opened however, fluid flow immediately starts at some finite value 70 as illustrated in FIG. 6. The particular flow rate occurring initially is determined by the length of the helical passageway and its cross-sectional area. Now as the adjusting screw 106 is withdrawn from the metering plug 104, the flow rate gradually and linearly increases with each turn of the knob. The panel 140 may be calibrated to permit the ready adjustment of the flow rate to any desired value.

In the prior art it has been suggested as, for example, in U.S. Patent 2,265,888, that a threaded tapered plug might be screwed into a uniformly tapered receiver to provide a spiral path of variable capacity through which fluids might flow. In such cases, however, unconventional threading practices are required since the manufacture of a tapered plug is a much more difficult operation than the threading of straight cylindrical tubes and rods, etc. Moreover, the response of this device would be non-linear and would not afford the precise control provided by the present invention.

By contrast, high accuracy of control can be very simply achieved according to the present invention. It has the advantage that there is an essentially linear relationship between the length of the threaded path and the pressure drop through this path. The length of the path is directly proportional, of course, to the distance to which the plug is screwed into the threaded receiver. With a little experience, an operator can quickly and quite accurately estimate the number of turns or fractions of turns of the threaded plug needed to obtain a desired change in pressure drop. Hence only one or two adjustments normally will be needed to bring the pressure into balance or bring it to the desired level.

The prior art also has suggested, as in U.S. Patent No. 2,964,288, that a smooth sleeve member be inserted in a threaded device to provide a spiral flow path and that the depth or extent of insertion of the sleeve can be varied to vary such flow. In this case, however, there is no possibility of controlling extremely small rates of flow of the magnitude required of the present invention nor is there, apparently, nearly the precise control over the flow rate which is possible with the arrangement of the present invention.

The mechanism of the present invention has a further advantage, particularly when used in the chromatograph art. It is not adversely affected by temperature. Since lubricants often cannot be used, or must be used with great care to avoid false analyses, pressure adjusting devices suggested in the past have involved orificed discs or analogous parts made of plastic or resinous materials which cannot withstand high temperatures. The metal parts ordinarily used for the present invention have no such temperature limitation. However, in services where elevated temperatures are not used, the plug 25, and other parts if desired, may be made of plastic materials such as polyamides (nylon), fluorinated hydrocarbon polymers (Teflon) and the like.

It will be obvious that various modifications and changes can be made without departing from the spirit of this invention. It is intended to cover such changes or modifications as would occur to those skilled in the art by the following claim, so far as the state of the prior art permits.

What is claimed is:

A device for controlling the rate of flow of a fluid comprising a first member having a cylindrical passageway, said passageway having internal screw threads, a second member having external screw threads adapted to engage said internal screw threads, the major diameters of said screw threads being substantially equal, the angle of said internal and said external threads being different, the minor diameter of said internal screw thread being less than or substantially equal to the minor diameter of said external screw thread, thereby to form a helical conduit through which said fluid may flow.

References Cited in the file of this patent

UNITED STATES PATENTS

| | | |
|---|---|---|
| 2,312,834 | Hahn | Mar. 2, 1943 |
| 2,532,019 | Goldberg | Nov. 28, 1950 |
| 2,568,123 | Goldberg | Sept. 18, 1951 |
| 2,658,528 | Ifield | Nov. 10, 1953 |

FOREIGN PATENTS

| | | |
|---|---|---|
| 560,262 | Great Britain | Mar. 28, 1944 |
| 746,797 | Germany | Dec. 27, 1944 |